United States Patent
Steenackers

[11] Patent Number: 5,531,968
[45] Date of Patent: Jul. 2, 1996

[54] CATALYTIC CONVERTER FOR THE CATALYTIC TREATMENT OF EXHAUST GAS

[75] Inventor: Pieter D. Steenackers, Heverlee, Belgium

[73] Assignee: Scambia Industrial Developments AG, Schaan, Liechtenstein

[21] Appl. No.: 253,894

[22] Filed: Jun. 3, 1994

[30] Foreign Application Priority Data

Jun. 4, 1993 [CH] Switzerland ............................ 1678/93

[51] Int. Cl.$^6$ ................................................. B01D 53/94
[52] U.S. Cl. ........................... 422/176; 422/180; 422/181; 422/220; 422/222
[58] Field of Search .................................. 422/176, 177, 422/181, 211, 218, 220, 180, 222

[56] References Cited

U.S. PATENT DOCUMENTS

| | | | |
|---|---|---|---|
| 3,535,879 | 10/1970 | Kuntz | 60/200 |
| 3,594,131 | 7/1971 | De Palma et al. | 422/220 X |
| 3,736,105 | 5/1973 | Tourtellotte et al. | 422/171 |
| 3,811,845 | 5/1974 | Nakamura | 422/181 X |
| 4,148,860 | 4/1979 | Goedicke | 422/176 |
| 4,196,170 | 4/1980 | Cemenska | 422/181 X |
| 4,385,031 | 5/1983 | Fratzer et al. | 422/181 X |
| 5,119,551 | 6/1992 | Abbott | 422/180 X |

FOREIGN PATENT DOCUMENTS

| | | |
|---|---|---|
| 0514326 | 11/1992 | European Pat. Off. . |
| 2201881 | 7/1973 | Germany . |
| 2905241 | 8/1980 | Germany . |
| 2128893 | 5/1984 | United Kingdom . |

*Primary Examiner*—Robert J. Warden
*Assistant Examiner*—Robert Carpenter
*Attorney, Agent, or Firm*—Anderson Kill Olick & Oshinsky

[57] ABSTRACT

The catalytic converter has an axis and a housing having an inlet and an outlet. The housing contains hollow cylindrical catalyst means having an inner surface, an outer surface and passages for the exhaust gas which run from the inner surface to the outer surface. In a cross-section at right angles to the axis, the catalyst means surround an inner space of the catalyst means, with which space the inlet communicates and which space contains a limiting and/or guide member. This has a limiting and/or guide surface which approaches the inner surface of the catalyst means in a direction away from the inlet and distributes the exhaust gas, flowing into the inner space of the catalyst means during operation, uniformly over the passages of the catalyst means.

19 Claims, 3 Drawing Sheets

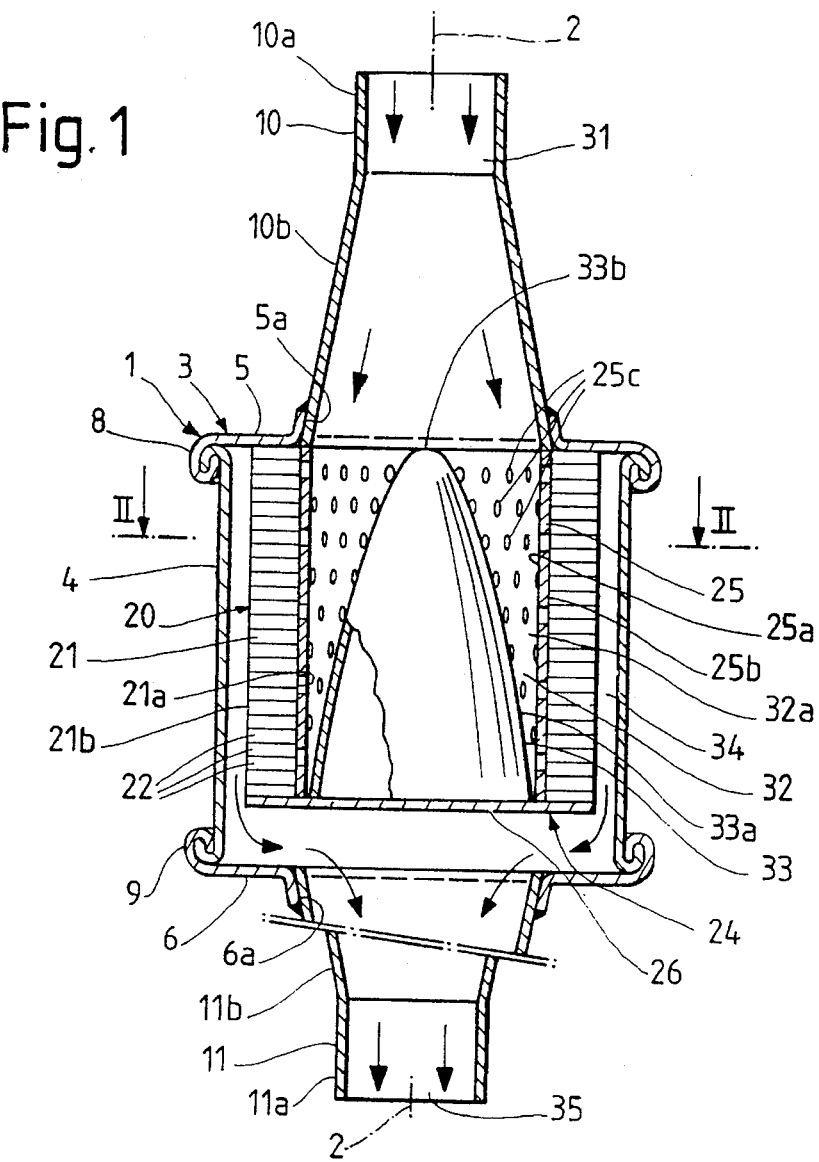
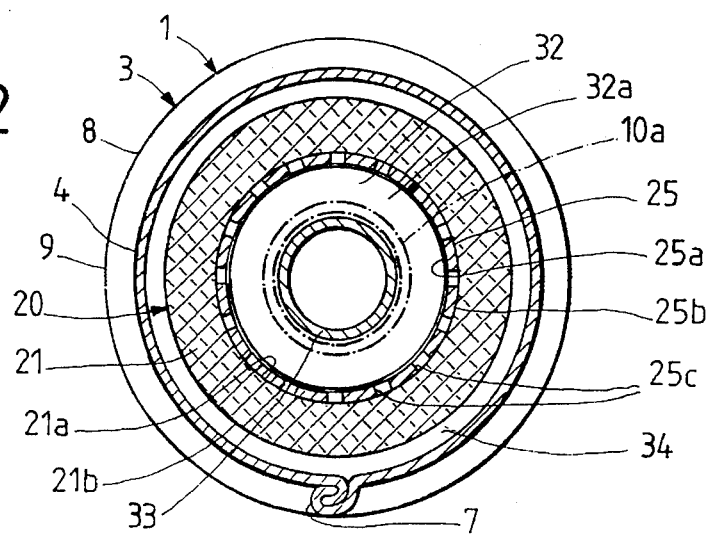

5,531,968

CATALYTIC CONVERTER FOR THE CATALYTIC TREATMENT OF EXHAUST GAS

BACKGROUND OF THE INVENTION

1. Field of the Invention

The invention relates to a catalytic converter for the catalytic treatment of exhaust gas. The catalytic converter is provided in particular to purify and/or to detoxify exhaust gas from an internal combustion engine, for example a gasoline combustion engine, by a catalytic treatment, i.e. to free said exhaust gas from pollutants, by converting the latter by a chemical reaction. The internal combustion engine may belong, for example, to an automobile or other motor vehicle or may be used for stationary operation—for example for driving an emergency power generator.

2. Description of the Prior Art

Known catalytic converters have a housing with an inlet and an outlet for the exhaust gas. The housing contains gas-permeable catalyst means in which the exhaust gas is catalytically treated during operation of the catalytic converters. The catalyst means have, for example, a catalyst support frequently designated as substrate or a plurality of catalyst supports or substrates through which the exhaust gas flows in succession during operation.

European Patent Disclosure 0 514 326 discloses, inter alia, catalytic converters having housings which have a cylindrical lateral wall and two flat end walls and contain catalyst means having at least one annular catalyst support. The or each annular catalyst support has an outer surface, an inner surface and passages running from the inner surface to the outer surface. In the case of the catalytic converters shown in FIGS. 6 and 10 of the cited publication, the inlet communicates with an inner space enclosed by the inner surface of an annular catalyst support. During operation of these catalytic converters, the exhaust gas flows through the inlet into the inner space, is deflected outward therein and flows from the inside to the outside through the catalyst support into an outer, annular cavity. Investigations have shown that the flow rate and the flow density of the exhaust gas in the catalyst supports varies slightly along the axis, the distribution of the flow density also depending on the amount of exhaust gas fed in per unit time. The inhomogeneity of the flow distribution reduces the efficiency of the catalyst supports and also causes axially inhomogeneous heating, so that the catalyst supports have to have larger dimensions than would be the case with an exhaust gas flow homogeneously distributed over the axial extension of the catalyst supports. A further disadvantage of the catalytic converters drawn in FIGS. 6 and 10 of the cited publication is that their housings—based on the amount of exhaust gas to be treated—have a rather large diameter, which makes it more difficult to arrange the catalytic converters under an automobile. It would be possible for the outer and inner diameters of the annular catalyst supports to be smaller and in turn the axial dimension of the annular catalyst supports to be increased in size so that the volume of the catalyst supports remains constant. In this case, however, the axial inhomogeneity of the flow distribution in the catalyst supports is greater.

In the case of catalytic converter drawn in FIG. 5 of the cited publication, the inlet communicates with a deflection cavity which is connected to an annular, outer cavity present between the lateral wall of the housing and the outer surface of the annular catalyst support, which surface widens conically away from the inlet. During operation of this catalytic converter, the exhaust gas flows through the inlet into the deflection cavity, is deflected outward in this cavity, enters the outer cavity, flows into the catalyst support at the outer surface of said support, flows through the catalyst support into an inner space and leaves the catalytic converter through the outlet. The conical outer surface of the catalyst support improves the homogeneity of the flow density in the catalyst support. Since this consists of annular, corrugated sheet metal members having diameters changing gradually along the axis, the production of this catalyst support is, however, expensive. Furthermore, in the case of the catalytic converter according to FIG. 5 as incidentally also in the case of the catalytic converters according to FIGS. 1 to 3 and 7 to 9 of the cited publication, the exhaust gas can come into contact with large wall parts of the housing and, via these, release a relatively large amount of heat to the environment before it flows into the catalyst support. In the case of a so-called cold start, i.e. when the catalytic converter is approximately at ambient temperature at the beginning of the exhaust gas feed, this has the disadvantage that it takes a relatively long time for the catalyst support to reach the temperature required for efficient exhaust gas treatment.

The catalytic converter disclosed in German Patent Disclosure 2 201 881 has a housing with a cylindrical lateral wall which is connected, by transition sections tapering conically away from said lateral wall, to cylindrical connection pieces which serve as inlet and outlet for the exhaust gas. The housing contains a catalyst support having axial passages for the exhaust gas. The catalyst support is for the most part cylindrical but has, at its end located closer to the inlet, an end section which is in the form of a truncated cone and projects into the conical transition section of the housing. According to the drawing in this publication, the catalyst support has, at right angles to its axis and hence at right angles to the direction of flow of the exhaust gas flowing through it, a cross-sectional area which is only about four times as large as the cross-sectional area of the cavities bordered by the connection pieces. The exhaust gas therefore flows through the catalyst support at a relatively high velocity. The individual passages of the catalyst support must therefore have relatively large cross-sectional dimensions, since otherwise the flow resistance and the pressure loss are very large. However, the consequence of large cross-sectional dimensions of the individual passages is that the exhaust gas flowing through the catalyst support has only relatively little contact with those surfaces of the catalyst support which are coated with catalytically active material and border the passages. The passages must therefore be relatively long, which increases the flow resistance and pressure loss in an undesirable manner. Furthermore, the volume, the weight and production costs of the catalyst support are relatively high, based on the amounts of exhaust gas flowing through the catalytic converter per unit time. According to the last-cited publication, the truncated cone-like end section of the catalyst support is intended to distribute the exhaust gas flowing in through the inlet uniformly over the entire cross-sectional area of the catalyst support. However, the proprietor of the present patent application has performed numerical flow calculations for a similarly formed catalytic converter which show that the flow density in the catalyst support is still dependent on the distance from the axis and is lower in the outer cross-sectional regions than in the middle cross-sectional region. Since, according to the drawing of the last-cited publication, the conical transition section of the housing, which section is adjacent to the inlet connection piece, makes a rather large angle, namely an angle of about 30°, with the axis, there is furthermore the danger, in the case of high flow velocities, that the exhaust gas flow, on entering that region of the inner space of the housing which is bordered by the conical transition section, will become detached from its wall and will become turbulent, increasing the flow resistance.

The catalytic converter disclosed in British Patent Disclosure 2 128 893 has a hollow cylindrical catalyst support. The inlet of the catalytic converter communicates with the inner space enclosed by the cylindrical inner surface of the catalytic converter. The cylindrical outer surface and that end surface of the catalyst support which faces the outlet border an outer cavity connected to the outlet. The catalyst support is formed from a coil of an originally flat wire cloth and of a corrugated wire cloth and is gas-permeable both in the axial and in the radial direction. During operation of the catalytic converter, the exhaust gas flows into the catalyst support at the cylindrical inner surface of said support and then out of the catalyst support again partly at the cylindrical outer surface and partly at the flat end surface of the catalyst support. This catalytic converter has the disadvantage that the flow velocity and flow density of the exhaust gas flowing into the catalyst support at the inner surface of said support vary rather considerably along the axis. Furthermore, the exhaust gas covers distances in the catalyst support which are of different lengths and in some cases only very short and said exhaust gas is therefore catalytically treated only insufficiently in part.

The catalytic converter disclosed in U.S. Pat. No. 3,736, 105 has a housing and catalyst means which have an inner and an outer, conical catalyst bed of annular cross-section. Each catalyst bed is bordered by perforated, conical lateral walls and has a particulate material arranged between said lateral walls. The inlet communicates with the inner space enclosed by the inner, conical lateral wall. Said inner space tapers away from the inlet but has, at its end opposite the inlet, a diameter which is still about 30% of the diameter of that end of the inner space which is connected to the inlet. The flow velocity and flow density of the exhaust gas flowing into the inner catalyst bed at the inner lateral wall of said catalyst bed varies rather considerably along the axis in the case of this catalytic converter too. The exhaust gas distribution is also dependent in particular on the velocity and amount of exhaust gas flowing through the inlet. Since the catalyst bed consists of a particulate material, the density and gas permeability of the bed may differ from place to place and may vary in the course of time.

SUMMARY OF THE INVENTION

It is an object of the invention to provide a catalytic converter by means of which disadvantages of the known catalytic converters can be avoided. It is intended in particular to achieve during operation as homogeneous a distribution as possible of the flow density over an inner surface of the catalyst means and as low a flow resistance as possible. Furthermore, the catalytic converter should be capable of being readily installed under the bottom of an automobile and of being economically produced and should rapidly provide good, catalytic exhaust gas treatment during a cold start.

This object is achieved, according to the invention, by a catalytic converter for the catalytic treatment of exhaust gas, in particular exhaust gas from an internal combustion engine, having an axis, a housing and catalyst means arranged therein, the housing having a lateral wall surrounding the axis, an inlet connected to an inner space, and an outlet, the catalyst means having an inner surface bordering the inner space, an outer surface facing the lateral wall and passages running from the inner surface to the outer surface, and an outer cavity being present between the lateral wall and the outer surface of the catalyst means, wherein a limiting member which is located at least partly in the inner space and has a limiting surface is present, which limiting surface together with the inner surface of the catalyst means borders a free inner space region and approaches the inner surface of the catalyst means at least in a part of the inner space away from the inlet, so that the cross-sectional area of the free inner space region decreases away from the inlet at least in the stated part of said region.

The housing and the catalyst means may be, for example, essentially rotationally symmetrical with the axis of the catalytic converter. The catalyst means may then have a hollow cylindrical catalyst support of circular cross-section.

The housing and/or the inner surface of the catalyst means and/or the outer surface of the catalyst means may, however, also be non-rotationally symmetrical with the axis of the catalytic converter. The housing of the catalytic converter may then have, for example, a lateral surface with an oval or oval-type cross-sectional shape. Furthermore, the catalyst means may then have, for example, an outer surface or peripheral surface with a shape with an oval or oval-type cross-section. The term "oval-type shape" is also intended to include ellipses and rectangles in which the apices or even the entire shorter sides are replaced by arcs. A longer main axis and a shorter secondary axis at right angles thereto can be assigned to the oval or oval-type shape or line, analogously to an ellipse and an oval.

BRIEF DESCRIPTION OF THE DRAWINGS

The subject of the invention is illustrated with reference to embodiments shown in the drawings. In the drawings, FIG. 1 shows an axial section through a catalytic converter, FIG. 2 shows a cross-section through the catalytic converter along the line II—II of FIG. 1.

DESCRIPTION OF THE PREFERRED EMBODIMENTS

Figure 3:
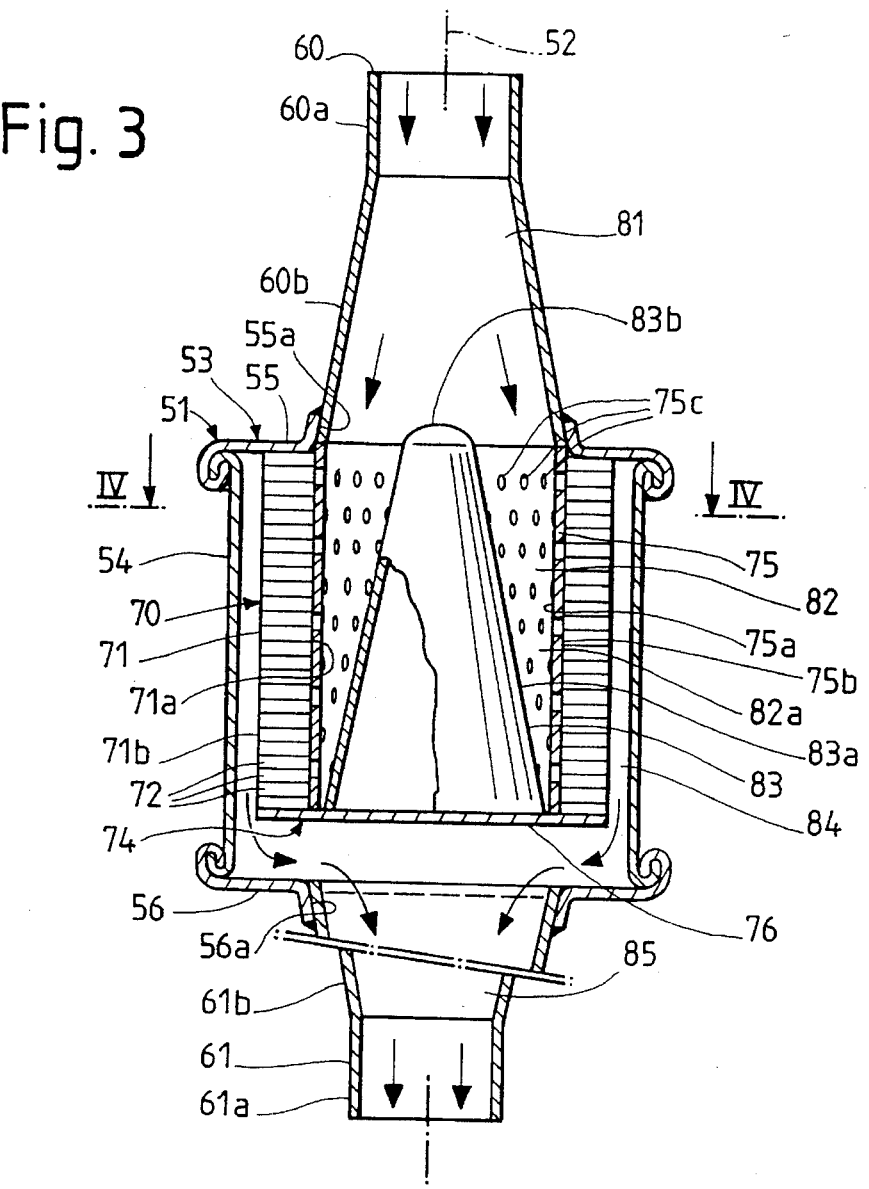
FIG. 3 shows an axial section through another catalytic converter.

The catalytic converter 1 shown in FIGS. 1 and 2 and intended for the catalytic treatment of exhaust gas has a central axis and/or longitudinal axis 2 and an elongated housing 3, for example essentially rotationally symmetrical with the axis 2. The housing 3 has a metallic wall consisting, for example, of stainless steel and having a lateral wall 4 surrounding the axis 2 and an end wall 5 and 6 at each of the ends of said lateral wall.

The lateral wall is parallel to the axis 2, essentially cylindrical and, for example, essentially circular in cross-section. The lateral wall 4 consists, for example, of a sheet metal piece which is curved to form a cylinder and has edges which are parallel to the axis 2 and are flanged and/or folded and joined to one another by a flange joint and/or folded joint 7. The edges of the lateral wall 4 which are located at the two ends of said wall are connected by flange joints and/or folded joints 8 and 9 to the two end walls 5 and 6, respectively, which are likewise formed from sheet metal pieces. The end walls 5 and 6 have, in the center, a collar which projects away from the lateral wall and borders a hole 5a or 6a. The housing furthermore has an inlet 10 and an outlet 11 for the exhaust gas. The inlet 10 and the outlet 11 are coaxial with the axis 2 and each consist of a connection piece which projects into the hole 5a or 6a, and the connection piece belonging to the inlet 10 may project through the hole 5a slightly into the space surrounded by the lateral wall 4. The two connection pieces are connected firmly and tightly to the end wall 5 or 6, namely welded to the collar bordering the hole 5a or 6a. The inlet 10 and the outlet 11 have, at their ends opposite the lateral wall, a cylindrical end section 10a or 11a and a transition section 10b or 11b widening conically away from said end section toward the end walls. Of the two conical transition sections 10b, 11b, at least the transition section 10b belonging to the inlet 10 should make an angle with the axis 1 which is preferably not more than 20°, for example not more than 15°.

Catalyst means 20 are arranged in the housing. These have an annular and/or sleeve-like catalyst support 21 which surrounds a central axis and/or longitudinal axis 2, is coaxial with said axis and is frequently referred to in technical language as a substrate. The catalyst support 21 has an inner surface 21a and an outer surface 21b. In a cross-section at right angles to the axis 2, the two surfaces 21a, 21b are circular and are parallel to the axis 2 and to the lateral wall 4. The catalyst support 21 thus forms a hollow cylinder having a circular cross-section. As will be described in more detail, the catalyst support 21 has a number of annular sheet metal members which are adjacent to one another and on which at least one catalytically active noble metal is applied and which together border passages for the exhaust gas which are denoted by 22 in FIG. 1. The passages 22 run essentially along planes at right angles to the axis 2, from the inner surface 21a to the outer surface 21b.

The catalyst means 20 furthermore have retaining means 24 which hold together the sheet metal members and connect the packet of sheet metal members which forms the catalyst support 21 to the housing 3. The retaining means 24 have, for example, a metal sleeve 25 which passes through the catalyst support 21. The sleeve 25 has an inner surface 25a and an outer surface 25b and is cylindrical, so that the inner surface 25a and the outer surface 25b are parallel to the axis 2. The inner surface 25a and outer surface 25b are circular in cross-section. The internal diameter of the sleeve 25 is approximately, and preferably exactly, equal to the internal diameter of that end of the inlet 10 which is closer to the end wall 5, i.e. of the further end of the conical inlet section 10b. The external diameter of the sleeve 25 is, for example, slightly smaller than the internal diameter of the catalyst support 21 formed by annular sheet metal members, so that a narrow gap of circular cross-section is present between said support and the sleeve 25. However, the external diameter of the sleeve 25 may instead be equal to the internal diameter of the catalyst support 21, so that the latter surrounds the sleeve 25 tightly and without play. The sleeve is provided with perforations, which are formed by a large number of radial holes 25c.

It should be noted here that FIGS. 1 and 2 are in part not drawn to scale and that in particular the wall thicknesses of the housing parts, the dimensions measured parallel to the axis 2 and spacings between the passages 22 and the dimensions and spacings of the holes 25c are in reality much smaller than those drawn in FIGS. 1 and 2, in comparison with the outer dimensions of the housing 3 and of the catalyst support 21. Furthermore, in reality the holes 25c have dimensions and are distributed in such a way that the holes 25c overlap without gaps along the axis 2. Moreover, the catalyst supports 21 and sleeve 25 are formed in such a way that exhaust gas flowing through the holes 25a can flow into all passages 22 during operation of the catalytic converter 1. The exhaust gas can at least partly pass from boles 25c, in the direction radial to the axis 2, into a passage 23. If an annular gap is present between the catalyst support 21 and the sleeve 25, the exhaust gas can, during operation, also be distributed in said gap and flow between the holes 25c adjacent to one another, along the inner surface 21a of the catalyst support 21 and the outer surface 25b of the sleeve 25. If the sleeve 25 is considered as part of the catalyst means 20, the holes 25c of the sleeve 25, together with the passages 22 of the catalyst support 21, form the passages 22, 25c of the total catalyst means 20.

The sleeve 25 consists of a metallic material, for example stainless steel, and, at its end closest to the inlet 10, is firmly and tightly connected to said inlet. The sleeve 25 and the connection pieces forming the inlet 10 can, for example, consist of originally separate parts and can be firmly and tightly welded to one another in the plane defined by the inner surface of the end wall 5 or, at a small distance from said plane, in the space surrounded by the lateral wall 4. However, the inlet 10 and the sleeve 25 may also consist of a single member. Furthermore, instead of being welded directly to the connection pieces forming the inlet 10, the sleeve 25 could be welded to the end wall 5 and connected via the latter to the last-mentioned connection piece.

The retaining means 24 furthermore have a retaining member 26. This consists of a small flat, circular, metallic plate whose diameter is approximately equal to the external diameter of the catalyst support 21. The retaining member 26 is fastened firmly and tightly at that end of the sleeve 25 which is furthest away from the inlet 10, i.e. is welded to said end. The catalyst support 21 is arranged between the end wall 5 arid the retaining member 26 and is, for example, directly adjacent to the end wall 5 and the retaining member 26 so that the end wall 5 and the retaining member 26 hold together the annular sheet metal members of the catalyst support 21.

In cross-section, the inlet 10 surrounds an inlet inner space 31. The catalyst means 20 and the sleeve 25 border and surround, in cross-section, an inner space 32 of the catalyst means or inner cavity 32 which is connected to the inlet inner space 31 and is tightly closed, at its end furthest away from the inlet 10, by the retaining member 26 which also serves as a terminating member. A limiting and/or guide element 33 is arranged at least partly in the inner space 32 of the catalyst means and has a limiting and/or guide surface 33a which at least partly faces the inner surface 25a of the sleeve 25 and hence also the inner surface 21a of the catalyst support 21. Said surface 33a approaches the inner surfaces 21a and 25a at least in a part of the inner space 32, in a direction away from the inlet 10. A part of the limiting and/or guide surface 33a extending along at least 50% of the axial dimension, i.e. the dimension, measured parallel to the axis 2, of the catalyst means and of the inner surfaces 21a and 25a, and preferably a part of the limiting and/or guide surface 33a extending essentially along the entire axial dimension of the catalyst means and of the inner surfaces 21a and 25a, is inclined outward away from the axis 2 toward the inner surfaces 21a and 25a, in a direction away from the inlet 10. The limiting and/or guide surface 33a is curved at that end 33b of the limiting and/or guide member 33 which is closer to the inlet 10, at least in the axial section drawn in FIG. 1 and namely also in all other, possible axial sections, and is continuously cohesive with a region of the surface 33a which faces the inner surfaces 21a and 25a. Furthermore, essentially the entire surface 33a present in the inner space 32 has convex curvature, at least in the axial section drawn in FIG. 1 and namely also in all other possible axial sections, and is at least only approximately parabolic. The limiting and/or guide member 33 accordingly consists of a hollow member which is rotationally symmetrical relative to the axis 2 and at least approximately and essentially parabolic, and is fastened, at its thicker end further away from the inlet 10, rigidly and tightly to the retaining member 26 and/or to the sleeve 25, for example by a weld joint. That end 33b of the limiting and/or guide member 33 which forms the vertex of the paraboloid is approximately in the plane which is at right angles to the axis 2 and in which the inlet 10 communicates with the inner space 32 of the catalyst means. In the inner space 32, the limiting and/or guide member 33, together with the sleeve 25 surrounding said inner space, borders a free inner space region 32a which has an annular cross-section. The cross-sectional area of the inner space region 32a decreases along the axis 2 in a direction away from the inlet 10, at least approximately or exactly linearly with the distance from the inlet 10 and from the end 33b of the limiting and/or guide member 33. That end of the limiting and/or guide surface 33a which is further away from the inlet 10 comes into contact with the inner surface 25a of the sleeve 25 or, at right angles and radially to the axis 2, is a distance away from said inner surface which is not more than 5% and preferably not more than 3% of the diameter of the inner surface 25a and of the inner space 33.

An outer cavity 34 has a section which extends between the lateral wall 4 and the outer surface 21b of the catalyst support 21, from the end wall 5 to the end wall 6, and a section present between the end wall 6 and the retaining member 26. The outer cavity 34 is separated from the inner inlet space 31 and from the inner space 32 of the catalyst means by the catalyst support 21, the sleeve 25 and the retaining member 26.

The inner surface 25a of the sleeve 25, which surrounds the inner space 32 of the catalyst means in cross-section also forms the inner surface of the entire catalyst means 20 and, during operation, serves as an exhaust gas entry surface of the catalyst means 20. The inner surface 21 of the catalyst support 21 accordingly forms its exhaust gas entry surface. The outer surface 21b of the catalyst support 21 also forms the outer surface and the exhaust gas exit surface of the entire catalyst means 20.

The length, i.e. the dimension of the catalyst support 21 measured parallel to the axis 2, is at least equal to the radial distance of the outer surface 21b from the inner surface 21a and preferably at least twice and, for example, even at least three times larger than the stated distance. The external diameter of the catalyst member 21 is, for example, at most or approximately equal to the axial dimension of the catalyst support 21. Furthermore, the external diameter is, for example, at most or approximately three times greater than the internal diameter of the cylindrical section 10a of the inlet 10. The maximum external diameter of the housing 3 is preferably not more than five times greater than the internal diameter and than the external diameter of the cylindrical section 10a of the inlet 10. The inner surfaces 21a and 25a are preferably at least 10 times and preferably 15 times greater than the cross-sectional area of the inner space of the cylindrical inlet section 10a.

Figure 4:
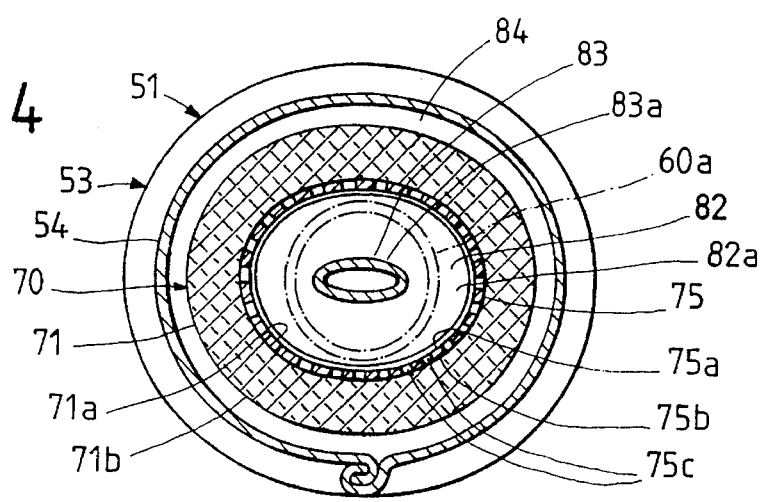
FIG. 4 shows a cross-section through the catalytic converter according to FIG. 3, along the line IV—IV of the latter.

The catalytic converter 51 shown in FIGS. 3 and 4 has a central and/or longitudinal axis 52 and a housing 53. This has a lateral wall 54 and two end walls 55, 56. The lateral wall 54 and the end walls 55, 56 have shapes non-rotationally symmetrical relative to the axis 52 and are, for example, of an oval or oval-type shape in a direction of view parallel to the axis 52. The end wall 55 has a central hole 55a, which likewise is of an oval or oval-type shape. The end wall 56 has a central hole 56a which is circular or may also be of an oval or oval-type shape. The housing 53 is provided with an inlet 60 and an outlet 61. The inlet 60 has a cylindrical section 60a of circular cross-section and a transition section 60b which extends from the cylindrical section 60a into the hole 55a and whose cross-section fits tightly therein. The axial section shown in FIG. 3 runs through the longer main axis of the oval defined by the housing 53 and the hole 55a. In the axial section shown in FIG. 3, the transition section 60b widens from the cylindrical section 60a toward the end wall 55. In an axial section running through the shorter main axes of the oval and at right angles to the plane of intersection of FIG. 3, the transition section 60b can—depending on the cross-sectional dimension of the hole 55a measured in this axial section—become wider or become narrower in a direction away from the cylindrical section 60a or be parallel to the axis 52. The outlet 61 likewise has a cylindrical section 61a of circular cross-section and a transition section 61b which extends away from this into the hole 56a of the end wall 56. In accordance with the shape of the hole 56a, said transition section 61b may be rotationally symmetrical relative to the axis 52 and conical or may have an oval or oval-type cross-sectional shape at its ends present in the hole 56a.

The housing 53 contains catalyst means 70 having a catalyst support 71. This has an inner surface 71a and an outer surface 71b. These surfaces are parallel to the axis 52 and, in a cross-section at right angles to the latter, at least approximately oval and at least approximately parallel to the lateral wall 54. The catalyst support 71 thus forms a hollow cylinder having an oval or oval-type cross-section. The catalyst support 71 contains and borders passages 72 for the exhaust gas. The catalyst means 70 furthermore have retaining means 74 with a sleeve 75 which has an oval or oval-type cross-section and possesses an inner surface 75a, an outer surface 75b and holes 75c. Furthermore, a retaining member 76 belonging to the retaining means 74 is present, which retaining member consists of a small flat, oval or oval-type plate.

The inlet 60 surrounds, in cross-section, an inlet inner space 81 which communicates with an inner space of the catalyst means or inner cavity 82 surrounded in cross-section by the sleeve 75 and by the catalyst means 70. A limiting and/or guide member 83 which consists of a hollow member fastened, namely welded, to the retaining member 76 and/or to the sleeve 75 and has a limiting and/or guide surface 83a on the outside is arranged in said inner cavity. That end 83b of the limiting and/or guide member 83 which is furthest away from the retaining member 76 is arranged approximately at that end of the inner space 82 of the catalyst means which is closer to the inlet, and projects, for example, slightly out of said inner space of the catalyst means into the transition section 60b of the inlet 60. The limiting and/or guide surface 83a is, at least in the largest part of the inner space 82 and preferably essentially in the entire inner space 82, inclined outward away from the axis 52 toward the inner surface 75a of the sleeve 75, in a direction away from the inlet 60. In the axial section shown in FIG. 3, and for example in all other axial sections, the largest part of the limiting and/or guide surface 83a is straight. At the end 83b of the member 83, the surface 83a has a section which is curved in the axial section shown in FIG. 1 and for example in all other axial sections and which is continuously cohesive with that region of the limiting and/or guide surface 83a which is straight in the axial sections. Said limiting and/or guide surface has an oval or oval-type shape at its end furthest away from the inlet, in direction of view parallel to the axis 52 and in cross-section, at least approximately parallel to the inner surface 75a of the sleeve 75, and has dimensions such that it comes into contact with the inner surface 75a or is at a distance away therefrom which is not more than 5% and preferably not more than 3% of the maximum diameter, i.e. of the maximum cross-sectional dimension of the inner space 82, measured along the longer main axis of the oval. The limiting and/or guide surface 83a is, for example, of oval or oval-type cross-section at least approximately up to the end 83b of the member 83 and at least approximately parallel to the inner surface 75a in cross-section. In this context, reference may be made to the cross-section which is shown in FIG. 4 and whose sectional plane running along the line IV—IV of FIG. 3 is fairly close to the end 83b.

The limiting and/or guide member 83, together with the inner surface 75a of the sleeve 75, borders a free inner space region 82a of annular cross-section. Furthermore, an outer cavity 84, arranged analogously to the outer cavity 34 of the catalytic converter 1, and an outlet cavity 85 surrounded in cross-section by the outlet 61 are present.

Unless stated otherwise above, the catalytic converter 51 may be identical or similar to the catalytic converter 1. The parts of the catalytic converter 51 each correspond to parts of the catalytic converter 1 which are denoted by reference symbols which are smaller by a factor of 50 than the reference symbols serving to denote the parts of the catalytic converter 51.

Figure 5:
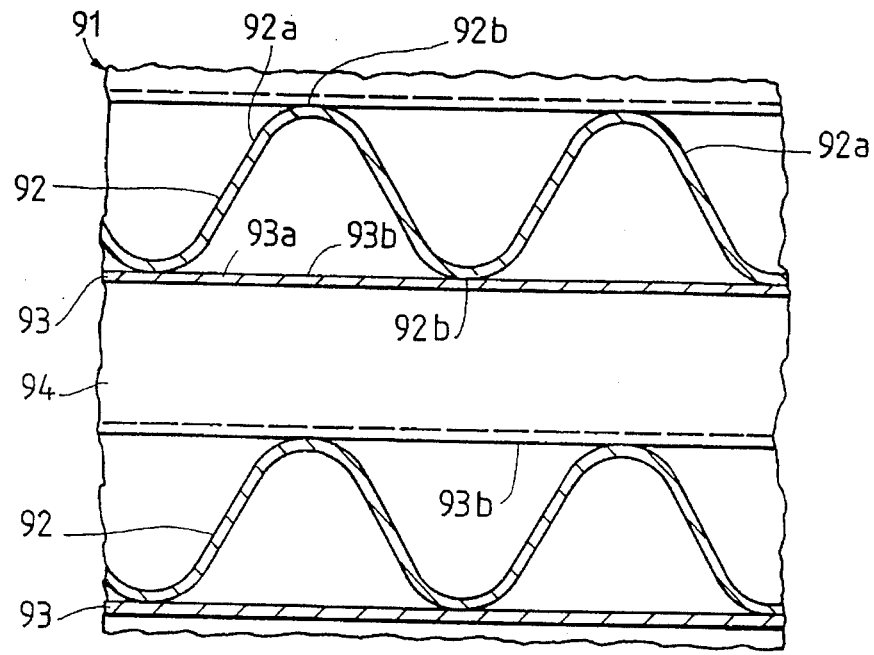
FIG. 5 shows a section through a catalyst support of the catalytic converters on a larger scale and FIG. 6 shows a section through another catalyst support.

The catalyst support 21 and the catalyst support 71 can be formed, for example, according to FIG. 5, which shows a section from a catalyst support which is denoted by 91 in FIG. 5. The catalyst support 91 has a packet of annular sheet metal members 92 and 93 which alternate with one another along the axis of the catalytic converter 1 or 51. One set of inner edges of the sheet metal members 92, 93 together form the inner surface 21a or 71a of the catalyst support 21 or 71, respectively. The other, outer edges of the sheet metal members 92, 93 together form the outer surface 21b or 71b of the catalyst support 21 or 71 or 91, respectively. Each sheet metal member 92, 93 has a number of waves 92a or 93a with wave summits 92b or 93b. The waves 92a and wave summits 92b are straight and parallel to one another and are at right angles to the plane of the drawing and plane of the section in FIG. 5. The waves 93a and wave summits 93b are likewise straight and parallel to one another but make a right angle with the waves 92a and wave summits 92b and are parallel to the plane of the drawing and plane of the section in FIG. 5. The waves 92a thus cross the waves 93a, as indicated in FIGS. 2 and 4 by solid and dashed straight lines intersecting one another.

Two adjacent sheet metal members 92, 93 come into contact with one another at each of the points of intersection at their wave summits projecting toward one another and hence at a large number of approximately point-like contact sites distributed regularly over their surface. In the other surface regions not occupied by these point-like contact sites, a free intermediate space which forms the passage of catalyst support, denoted by 94 in FIG. 5, is present between the two adjacent sheet metal members.

Figure 6:
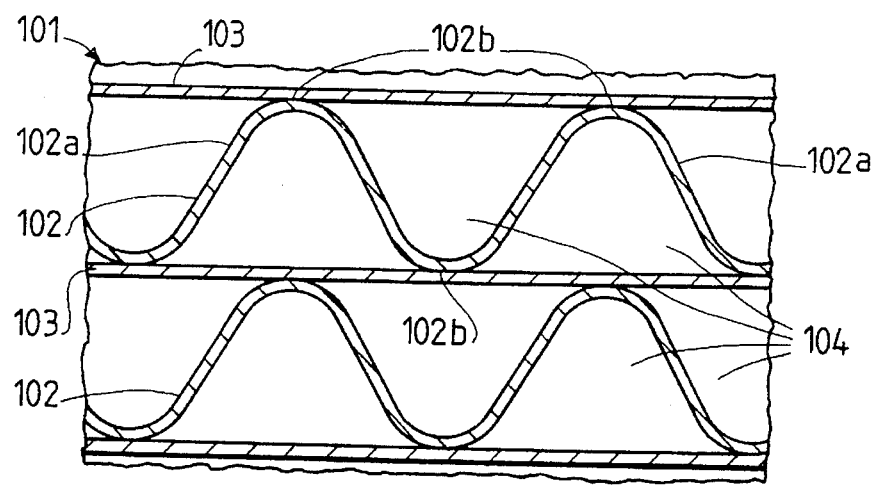

Catalyst supports 21 and 71 shown in FIGS. 1 to 4 could also be formed like or replaced by a catalyst support as shown in FIG. 6 and denoted by 101. The catalyst support 101 has a packet of annular sheet metal members 102 and 103 which alternate with one another and whose edges together form the cylindrical inner surface and cylindrical outer surface of the catalyst support. Each sheet metal member 102 has waves 102a with wave summits 102b. The sheet metal members 102 are, however, formed in such a way that each wave 102a runs from the cylindrical inner surface of the catalyst support 101 toward the cylindrical outer surface of the latter. The sheet metal members 103 are flat and rest against the wave summits 102b of their adjacent sheet metal members 102. A sheet metal member 102, together with the two sheet metal members 103 resting against it, borders a number of passages 104 which run from the inner to the outer surface of the catalyst support and are separated from one another over their entire length.

Each sheet metal member 92, 93, 102, 103 shown in FIGS. 5 and 6 has an inner region or core region which consists of stainless steel and whose surfaces are provided with a coating of aluminum oxide. Catalytically active material which contains at least one noble metal, for example platinum and/or rhodium, is applied to these coatings. The wave height of the coated sheet metal members 93, 94, 102 shown in FIGS. 5 and 6, measured from wave region to wave region, is preferably not more than 1 mm and, for example, approximately 0.3 mm to 0.7 mm. The wavelength is, for example, twice to four times greater than the wave height.

The inlet 10 or 60 of a catalytic converter 1 or 51, respectively, may be connected via parts of an exhaust system to the exhaust gas outlet of the gasoline combustion engine of an automobile and arranged under the bottom of the latter. In comparison with the internal diameter of the cylindrical section 10a and 60a of the inlet 10 or 60, respectively, and in comparison with the amount of exhaust gas to be treated per unit time, the housings of the catalytic converters 1 and 51 have relatively small cross-sectional dimensions and can therefore readily be accommodated.

During operation of the engine and the catalytic converter, the exhaust gas flows through the catalytic converter in the directions denoted by arrows in FIGS. 1 and 3. The exhaust gas thus flows through the inlet 10 or 60 into the free region of the inner space 32 or 82 of the catalyst means. Thereafter, the exhaust gas first flows through the lateral wall of the sleeve at the exhaust gas entry surface of the catalyst means 20 or 50, which surface is formed by the inner surface 25a, 75a of the sleeve 25 or 75, respectively, and then into the passages 22 or 72 of the catalyst support 21 or 71, respectively, at the inner surface 21a or 71a, respectively, of said catalyst support. The exhaust gas then flows through the catalyst support and is catalytically treated on contact with the surfaces bordering the passages 22 or 72. The exhaust gas emerges from the catalyst support 21 or 71 at the outer surfaces 21b or 71b of the catalyst support 21 or 71, respectively, which surface serves as an exhaust gas exit surface of the catalyst means 20 or 70, respectively, and the exhaust gas flows through the outer cavity 34 or 84 and leaves the catalytic converter through the outlet 11 or 61.

In the case of widely varying amounts of exhaust gas fed in per unit time, the limiting and guide member 33 or 83 distributes the exhaust gas, flowing from the inlet inner space 31 or 81 into the inner space 32 or 82 of the catalyst means, at least approximately uniformly over the total exhaust gas entry surface of the catalyst means 20 or 70. Investigations and numerical calculations have shown that the flow rate and the direction of flow of the exhaust gas present in the free inner space region 32a or 82a close to the inner surface 25a or 75a of the catalyst means are approximately constant for a constant amount of exhaust gas flowing per unit time through the catalytic converter, at the total inner surface of the catalyst means and in particular along the total axial extension of said surface. Accordingly, the flow rate and flow density are also approximately constant over the total inner surface 21a or 71a of the catalyst support 21 or 71. The same applies to the flow in the interior of the catalyst support in a sectional area present in said support and parallel to the inner surface 21a or 71a. According to the calculations, it is particularly advantageous if the cross-sectional area of the free inner space region decreases linearly along the axis in a direction away from the inlet, as is the case for free inner space region 32a.

The investigations and numerical flow calculations have furthermore shown that, at the flow rates occurring during operation in the inlet inner space 31 or 81, in the inner space 32 or 82 of the catalyst means, in the outer cavity 34 or 83 and in the outlet inner space 35 or 85, the flow is at least approximately turbulence-free, so that virtually no eddies and in particular no large eddies are formed in these spaces. Together with the uniform flow density of the exhaust gas in the catalyst support, this helps to keep the flow resistance and pressure loss small.

The small dimensions of the wave height and wavelength of the waves 92a, 93a, 102a ensure that the exhaust gas flowing through the passages of a catalyst support is in intimate contact with the catalytically active material. This permits relatively short passages and a relatively small volume of a catalyst support in comparison with the amount of exhaust gas to be treated per unit time, which keeps the space and material requirement and the production costs of a catalyst support low.

On flowing into the catalytic converter 1 or 51, the exhaust gas passes from the inlet 10 or 60, directly and without contact with the lateral wall and the end walls of the housing 3 or 53, to the inner space 32 or 82 of the catalyst means. Before flowing into the catalyst means, the exhaust gas therefore releases only a small amount of heat to the environment. During a cold start of the catalytic converter 1 or 51—i.e. when the latter is approximately at ambient temperature at the beginning of the feed of exhaust gas—the hot exhaust gas therefore heats the catalyst support 21 or 71 rapidly to the temperature required for efficient, catalytic treatment of the exhaust gas.

The inner spaces 31, 32 or 81, 82 of the catalytic converters 1 and 51, which spaces are located upstream of the catalyst means 20 and 70, are sealed completely gas-tight from the environment, so that the entire exhaust gas fed to the inlet 10 or 60 reaches the catalyst means, and the exhaust gas in these inner spaces has the same composition as the exhaust gas flowing out of the engine outlet. The flange and/or folded joints 7, 8, 9 of the catalytic converter 1 and the corresponding joints of the catalytic converter 51 can be produced more economically than weld joints and therefore help to keep the production costs low. Instead of being completely gas-tight, the flange and/or folded joints may be gas-tight only to a certain extent. Because they border only the outer cavity 34 or 84 located downstream of the catalyst means 20 or 70, a small leak which may be present in the flange and/or folded joints presents no problems.

The catalytic converters can be modified in various ways. In particular, features of the two catalytic converters 1 and 51 can be combined with one another. The limiting and/or guide member 33 may be, for example, essentially conical instead of paraboloid, and the end 33b may be pointed or may be rounded in axial section. Conversely, the limiting and/or guide member 83 may be essentially parabolic in the axial section through the longer main axis of the oval and/or in the axial section through the shorter main axis of the oval, and, for example, in all axial sections.

Furthermore, the flange and/or folded joints of the housing may be replaced by weld joints. In addition, the end wall 6 and 56 may be omitted and instead the transition section 11b or 61b of the outlet 11 or 61, respectively, can be extended at its end closer to the lateral wall 4 or 54 so that it can be joined directly to the lateral wall 4 or 54. The lateral wall 4 or 54 may then furthermore be shortened so that it is connected to the transition section of the outlet approximately in the plane defined by the retaining member 26 or 76. The lateral wall and one end wall or the lateral wall and the outlet may even consist of a single member.

Instead of consisting of a small compact plate, the retaining members 26, 27 could consist of an annular disk which is welded at its inner edge to the limiting and/or guide member 33 or 83. Furthermore, an intermediate layer which is annular, heat-insulating and/or slightly springy in the axial direction can also be arranged between the end wall 5 or 55 and the catalyst support 21 or 71. Instead, a ring could be fastened, for example welded, to the sleeve 25 or 75 a short distance from the end wall 5 or 55, and the catalyst support 21 or 71 could be arranged between this ring and the retaining member 26 or 76, so that an annular gap which is free, i.e. contains only exhaust gas during operation, and serves for heat insulation is present between the end wall 5 or 55 and the catalyst support.

Furthermore, a perforated sleeve surrounding the catalyst support can be present instead of a sleeve 25 or 75 located inside a catalyst support 21, 71 or in addition to said sleeve.

What is claimed is:

1. A catalytic converter for the catalytic treatment of exhaust gas comprising an axis, a housing and catalyst means for purifying the exhaust gas arranged therein, the housing having a lateral wall surrounding the axis, an inlet, and an outlet, the catalyst means having an inner surface bordering an inner space, an outer surface facing the lateral wall and a packet of sheet metal members, wherein the sheet metal members which are adjacent to one another and define passages for the exhaust gas running at angles to the axis, from the inner surface to the outer surface, wherein the sheet metal members support catalytically active material to purify the exhaust gas flowing through the passages, wherein the inlet is connected to the inner space, wherein an outer cavity is present between the lateral wall and the outer surface of the catalyst means, wherein a limiting member is located at least partly in the inner space and has a substantially parabolic limiting surface which, together with the inner surface of the catalyst means, borders a free inner space region, has a curved axial section at an end of the limiting member located closer to the inlet and approaches the inner surface of the catalyst means along the axis away from the inlet, so that the cross-sectional area of the free inner space region decreases along the axis linearly away from the inlet along an entire axial dimension of the inner surface of the catalyst means.

2. A catalytic converter as claimed in claim 1, wherein the inner surface of the catalyst means is essentially parallel to the axis.

3. A catalytic converter as claimed in claim 1, wherein the limiting surface is essentially parabolic in all axial sections.

4. A catalytic converter as claimed in claim 1, wherein, at an end of the inner surface of the catalyst means which is further away from the inlet, the limiting surface comes into contact with the inner surface of the catalyst means or is a distance away from this inner surface which is not more than 5% of the maximum cross-sectional dimension of the inner space.

5. A catalytic converter as claimed in claim 1, wherein the inner surface of the catalyst means and the free inner space region are annular in a cross-section at right angles to the axis and surround the limiting member.

6. A catalytic converter as claimed in claim 1, wherein the outer surface is a distance away from the inner surface of the catalyst means, and wherein the length of the catalyst means, measured parallel to the axis, is at least twice as large as the distance of the outer surface from the inner surface of the catalyst means.

7. A catalytic converter as claimed in claim 1, wherein at least every second sheet metal member has waves, wherein the sheet metal members have surfaces adjacent to said passages, and wherein the waves run along planes at right angles to the axis so that the passages run essentially along planes at right angles to the axis.

8. A catalytic converter according to claim 7, wherein all sheet metal members have waves and wherein the waves of each pair of adjacent sheet metal members cross one another.

9. A catalytic converter according to claim 8, wherein each sheet metal member is annular and encompasses the axis, and wherein the sheet metal members adjacent to one another contact each other at the summits of the waves.

10. A catalytic converter according to claim 7, wherein sheet metal members having waves and flat sheet metal members alternate with one another, and wherein each wave runs from the inner surface of the catalyst means to the outer surface thereof.

11. A catalytic converter as claimed in claim 1, wherein the housing has an end wall with a central hole at one end of the lateral wall, and wherein the inlet has a connection piece which is connected to the catalyst means through the hole in the end wall.

12. A catalytic converter as claimed in claim 11, wherein the lateral wall consists of a sheet metal part, wherein the end wall consists of a sheet metal part and wherein the sheet metal part forming the lateral wall has edges running from one end of the lateral wall to the other and connected to one another by a flange joint and/or is connected to the sheet metal part forming the end wall by means of a flange joint.

13. A catalytic converter according to claim 1, wherein the inner surface of the catalyst means is coaxial to the axis, cylindrical, and in cross-section circular, and wherein the limiting surface is rotationally symmetrical to the axis and parabolic in all axial sections.

14. Catalytic converter according to claim 1, wherein the inner surface of the catalyst means encompasses the axis, and wherein the free inner space region is annular in cross-section.

15. A catalytic converter as claimed in claim 1, wherein said end of the limiting member projects out of said inner space.

16. A catalytic converter for the catalyst treatment of exhaust gas comprising an axis, a housing and catalyst means for purifying the exhaust gas arranged therein, the housing having a lateral wall surrounding the axis, an inlet, and an outlet, the catalyst means having an inner surface bordering an inner space, an outer surface facing the lateral wall and a packet of a plurality of first and a plurality of second sheet metal members alternating with one another, wherein the inlet is connected to the inner space, wherein the first sheet metal members comprise waves running along planes at right angles to the axis, wherein the second sheet metal members are one of plane and of being provided with waves which cross the waves of the first sheet metal members so that the adjacent sheet metal members limit together passages for the exhaust gas running at angles to the axis from the inner surface to the outer surface, the sheet metal members supporting a catalytically active material purify the exhaust gas flowing through the passages, an outer cavity located between the lateral wall and the outer surface of the catalyst means, wherein a limiting member is located at least partially in the inner space and has a substantially parabolic limiting surface which, together with the inner surface of the catalyst means, borders a free inner space region and has a curved axial section at an end of the limiting member located closer to the inlet, wherein said end of the limiting member is disposed approximately in a plane in which the inlet communicates with the inner space and wherein the limiting surface approaches the inner surface of the catalyst means along the entire axial dimension of the inner surface of the catalyst means along the axis away from the inlet, so that the cross-sectional area of the free inner space region decreases along the axis linearly away from the inlet along the entire axial dimension of the inner surface of the catalyst means.

17. A catalytic converter according to claim 16, wherein the inner surface of the catalyst means encompasses the axis and wherein the free inner space region is annular in cross-section.

18. A catalytic converter according to claim 16, wherein the inlet has a transition section widening toward the inner space, and wherein the transition section has an end which is connected to the inner space and which has an inner diameter that it is equal to the diameter of the inner space.

19. A catalytic converter for the catalytic treatment of exhaust gas comprising an axis, a housing and catalyst means for purifying the exhaust gas arranged therein, the housing having a lateral wall surrounding the axis, an inlet and an outlet, the catalyst means having an inner surface that encompasses the axis and borders an inner space, an outer surface facing the lateral wall, and a plurality of annular, first and second sheet metal members alternating with one another, wherein the inlet is connected to the inner space, wherein said inner surface is cylindrical and has a circular cross-section, wherein the first sheet metal members comprise waves running along planes at right angles to the axis, wherein the second sheet metal members are one of planar and of being provided with waves which cross the waves of the first sheet metal members, wherein the adjacent sheet metal members contact each other at the summits of the waves and define passages running from the inner surface to the outer surface, the sheet metal members have surfaces adjacent to said passages and provided with catalytically active material being adapted to purify the exhaust gas flowing through the passages, an outer cavity located between the lateral wall and the outer surface of the catalyst means, wherein a limiting member is located at least partially in the inner space and has a limiting surface which, together with the inner surface of the catalyst means, borders a free inner space region annular in cross-section, wherein the limiting surface is curved in all axial sections at an end of the limiting member located closer to the inlet, wherein at an end of the limiting member located closer to the inlet, wherein said end of the limiting member is disposed in a plane in which the inlet communicates with the inner space, wherein the limiting surface is substantially parabolic in all axial surface of the catalyst means and approaches the inner surface of the catalyst means along the axis away from the inlet, so that the cross-sectional area of the free inner space region decreases along the axis linearly away from the inlet along the entire axial dimension of the inner surface of the catalyst means and wherein, at an end of the inner surface of the catalyst means which is further away from the inlet, the limiting surface comes into contact with the inner surface of the catalyst means or is a distance away from this inner surface which is not more than 5% of the diameter of the inner surface.

* * * * *